United States Patent Office 2,713,594
Patented July 19, 1955

2,713,594

PREPARATION OF METHYLENE BIS-AMIDES

Charles W. Sauer, Cambridge, Mass., assignor to Arthur D. Little, Inc., Cambridge, Mass., a corporation of Massachusetts No Drawing. Application December 7, 1950,
Serial No. 199,720

13 Claims. (Cl. 260—558)

This invention relates to the production of methylene bis-amides.

Prior to this invention relatively poor yields had been obtained in the preparation of methylene bis-amides, and methylene diformamide in particular. For instance, methylene diformamide is obtainable in about a 30% yield by reacting paraformaldehyde with formamide with the attendant production of water and loss of formaldehyde. Formaldehyde is given off during the reaction, and such evolution is disadvantageous.

It is an object of this invention to prepare methylene bis-amides without the incidental release of formaldehyde.

Another object is to prepare methylene bis-amides in good yields.

These, and other objects which will become apparent, may be accomplished by reacting hexamethylene tetramine with an amide. The methylene bis-amide crystals formed may be removed and more hexamethylene tetramine and amide added to the mother liquor for further reaction.

The process may then be made a continuous one or a batch process.

During the reaction ammonia is given off and should be removed as formed. No water is formed during the reaction, and since none is employed in the reaction, side reactions are maintained at a minimum, resulting in very good yields. It is essential, therefore, that hexamethylene tetramine be used as the source of formaldehyde. Formaldehyde or paraformaldehyde react with amides to yield water rather than ammonia in the course of the reaction.

For reasons that are not clear the excellent yields of this process are not apparent after the first reaction takes place, but only occur when a mother liquor is formed and new material is added to it.

Since it is easier to carry out the reaction when the reactants are in solution, a solvent may be added if the particular amide is not a solvent for the hexamethylene tetramine, and if the temperature is to be controlled by means other than refluxing the solvent. Typical solvents are dimethylformamide, quinoline and diethylcarbitol. Aqueous solutions are to be avoided as are any materials which will enter into the reaction to any appreciable extent. Once the mother liquor is formed no further solvent need be added as the reactants are soluble in the mother liquor.

Hexamethylene tetramine is reacted with a compound having the formula $NH_2COR$ where R is hydrogen, alkyl, cycloalkyl, substituted alkyl, heterocyclic, or aryl. As described in the examples below, it is evident that the R group does not enter into the reaction unless it contains a terminal group $—NH_2$. Thus alkyl, aryl, cycloalkyl, and heterocyclic groups may be employed as the R group as desired. Substituted alkyl groups such as aralkyl may similarly be employed. Substituted alkyl groups such as malonamide

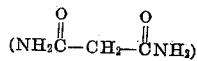

may also be used as shown in Example IV below, but such bifunctional materials should be used in one-half the molar quantities required of the monofunctional compounds. However, it is to be noted that urea is excluded from the definition of the amide since urea does not enter into the reaction to yield methylene bis-amides; the reaction with urea appears to be very complex and is not clearly understood. Urethanes, or esters of carbamic acid, react with hexamethylene tetramine to give methylene bis products, but in such low yields under the conditions described herein that they are also excluded from the scope of the claims.

If one, or both, of the hydrogen atoms attached to the nitrogen atom in the above formulation are replaced as by an alkyl radical the reaction will not go. N-methylformamide, for instance, will not react with hexamethylene tetramine under the conditions herein described. Such nitrogen substituted materials are, however, solvents and may be employed to advantage.

The reaction of hexamethylene tetramine and the amide at least after the initial reaction is best carried out in the approximate molar ratios in which they react. The quantity of hexamethylene tetramine and amide to be employed are determined, after the first reaction, by the yield of that reaction; the amount of hexamethylene tetramine and amide to be added is equal to that amount which will give a theoretical yield of 100% replacement of methylene bis-amide recovered by the first run. That is, if one mole of hexamethylene tetramine and twelve moles of formamide yield two moles of methylene bis-formamide, the amount of hexamethylene tetramine and formamide added to the resulting mother liquor should be ⅓ mole of hexamethylene tetramine and 4 moles of formamide. By following such procedure nearly 100% yields are secured.

Very high yields, through the replacement of methylene bis-amide by carrying out the reactions in the mother liquor, are predicated upon the continuous removal of the methylene bis-amide when formed, if the process is a continuous one, and at the end of each batch, if the process is a batch process.

An alternative method for reacting formamide and other liquid amides, is to employ in the first reaction an excess equal to about 100 to 200%. In the reaction between formamide and hexamethylene tetramine the initial yield, based on hexamethylene tetramine, is raised from about 30%, obtained by reacting equivalent quantities, to about 66%. Subsequent addition of equimolar quantities equivalent to the amount of methylene diformamide obtained increases the total yield in the order of about 5–10% above the initial yield. This method might be preferred in some instances.

The temperature, at which the process is carried out, is not critical. It must, however, be sufficient for the reaction to take place, and be below that at which any substantial decomposition of the reactants or product takes place. That the temperature is at least sufficiently high is evidenced by the evolution of ammonia, and the lowest temperature of evolution of ammonia in fact measures the minimum temperature to which the reactants are to be heated. As stated above, the temperature of boiling of the solvent may be used to govern the temperature of the reaction, and it follows that the solvent employed should be sufficiently high boiling to allow the reaction to proceed. Dimethylformamide, having a boiling point of 153° C., diethylcarbitol 188° C., and quinoline 238° C., are all satisfactory, and indicate acceptable temperatures of operation.

The time necessary to complete the reaction will vary with varying conditions, but a good indication of completion is the absence of release of ammonia.

More or less standard provisions for constant agitation of the mixture during reaction, removal of ammonia as formed, and refluxing of the solvent, are provided. Where a solvent having an extremely high boiling point is used, or where no solvent is employed, the temperature is regulated by conventional means.

To illustrate the unusually excellent yields obtainable by this process, the following example is given:

Example I

A mixture of 70 grams (0.5 mole) of hexamethylene tetramine and 270 grams (6 moles) of freshly distilled formamide were heated to 140° C. and maintained by regulation for four hours. On cooling, the crystals were separated.

The mother liquor was retained and to it was added 23.5 grams (0.185 mole) of hexamethylene tetramine and 90 grams (2 moles) of formamide. The mixture was maintained at 140° C. for five hours. The mixture was cooled and the crystals separated.

The mother liquor was used in subsequent experiments as above. The data on the yields is given below.

| Run | Mother Liquor from Runs | Moles of Hexamethylene tetramine | Moles of Formamide | Run Yield | | | Total Yield | | |
|---|---|---|---|---|---|---|---|---|---|
| | | | | Wt. | Theo. | Percent | Wt. | Theo. | Percent |
| 1 | | ½ | 6 | 87.8 | 306 | 29 | 87.8 | 306 | 29 |
| 2 | 1 | ⅙ | 2 | 79.3 | 102 | 78 | 161.1 | 408 | 41 |
| 3 | 2 | ⅙ | 2 | 84.1 | 102 | 82.5 | 251.2 | 510 | 49.5 |
| 4 | 3 | ⅙ | 2 | 80.5 | 102 | 79 | 331.7 | 612 | 54.5 |
| 5 | 4 | ⅙ | 2 | 91.1 | 102 | 89.5 | 422.8 | 714 | 59.5 |
| 6 | 5 | ⅙ | 2 | 106.8 | 102 | 105 | 529.6 | 816 | 65.0 |
| 7 | 6 | ⅙ | 2 | 108.8 | 102 | 106 | 638.4 | 918 | 69.7 |
| 8 | 7 | ⅙ | 2 | 109.9 | 102 | 107.5 | 748.3 | 1,020 | 73.5 |
| 9 | 8 | ⅙ | 2 | 86.8 | 102 | 85 | 835.1 | 1,122 | 74.5 |
| 10 | 9 | ⅙ | 2 | 100.1 | 102 | 98 | 935.2 | 1,224 | 76.3 |
| 11 | 10 | ⅙ | 2 | 98.8 | 102 | 97 | 1,034.0 | 1,326 | 78.2 |

Example II 540 grams (12 moles) of formamide, 140 grams (1 mole) of hexamethylene tetramine, and 500 cc. of dimethylformamide, were mixed and refluxed for 7 hours. The solution was cooled and 180 grams (39.4%) of methylene diformamide was recovered.

To the mother liquor was added 180 grams (4 moles) of formamide and 47 grams (.033 mole) of hexamethylene tetramine. The mixture was heated and refluxed for 6 hours, and cooled. 190 grams of methylene diformamide was recovered (93% yield).

Additions of similar amounts to the mother liquor were made, and crystals of methylene diformamide recovered many times. The yields resulting ran from 75% to 95% of theoretical.

The purified product is a white crystalline material melting at 141–140° C. It is soluble in water to the extent of 100 grams in 100 cc. of water, and 6.6 grams in 100 cc. of isopropanol.

Example III

Hexamethylene tetramine and acetamide in the molar ratio of 1 to 12 were dissolved in quinoline and the mixture refluxed for four hours. From the cooled solution a yield of 32.4% of theoretical of methylene disacetamide was recovered.

To the mother liquor was added an additional quantity of hexamethylene tetramine and acetamine in the same ratio as above; again the mixture was refluxed for four hours and cooled. The yield of white crystalline methylene diacetamide melting at 198–200° C. was 90% of theoretical.

Continued reuse of the mother liquor gave consistently high yields.

Example IV

Malonamide and hexamethylene tetramine in a ratio of 6 to 1 were mixed in dimethylformamide. The mixture was heated to dissolve the reactants in the solvent, and the solution refluxed for 6 hours. The solution was cooled and the white crystalline methylene-bis-malonamide melting at 234° C. recovered. The yield was 85.5% of theoretical.

As in the previous examples the mother liquor may advantageously be reused to maintain the high per cent yield values.

Example V

Benzamide and hexamethylene tetramine were dissolved in quinoline in the ratio of twelve moles to one. The mixture was refluxed for 5 hours, and cooled to recover white crystalline, methylene-bis-benzamide. The melting point is 216–220° C. The yield was 59% of theoretical in the first reaction. Repeated addition of more benzamide and hexamethylene tetramine in the ratio of twelve moles to one to the mother liquor yields similar results to those set forth in the prior examples.

The methylene derivatives described herein are useful intermediaries in the preparation of germicides. The process is also adapted to the preparation of long chain polymers through the reaction with amides such as adipamide.

In general the ratio of one mole of hexamethylene tetramine to twelve of a monofunctional and six of a bifunctional amide is preferred after the initial reaction since this is the proportions in which the reaction takes place. More or less of either reactant may be employed but the reacting ratios are preferred.

Having now described my invention, I claim:

1. A process for producing methylene bis-amides which consists of the steps of dissolving both an amide and hexamethylene tetramine in a non-aqueous solvent, reacting under anhydrous conditions in proportions so that the quantity of starting amide is at least equal to the stoichiometric ratio required to give two amide groups to one —$CH_2$— group, at a temperature above that at which ammonia is given off and below that at which decomposition of any of the reactants takes place, said amide having the formula $NH_2COR$ wherein R is a member of the group consisting of hydrogen, alkyl, amide-substituted alkyl, and aryl, removing the ammonia as formed, cooling the mixture and recovering crystalline methylene bis-amide.

2. The process according to claim 1 wherein the amide is formamide.

3. The process according to claim 11 wherein the amide is acetamide.

4. The process according to claim 12 wherein the amide is malonamide.

5. The process according to claim 13 wherein the amide is benzamide.

6. A process for producing methylene bis-amides which consists of the steps of dissolving both an amide and hexamethylene tetramine in a non-aqueous solvent, reacting under anhydrous conditions in proportions so that the quantity of starting amides is at least equal to the stoichiometric ratio required to give two amide groups to one —$CH_2$— group, at a temperature above that at which ammonia is given off and below that at which decomposition of any of the reactants takes place, said amide having the formula $NH_2COR$ wherein R is a member of the group consisting of hydrogen, alkyl, amide-substituted alkyl, and aryl, removing the ammonia as formed, cooling the mixture, removing the first crystalline methylene bis-amide to form a mother liquor, adding a second quantity of hexamethylene tetramine and said starting amide to the mother liquor so formed, reacting said hexamethylene tetramine and starting amide as in the previous reaction to form a second methylene bis-amide quantity and continuing the reaction in the mother liquor as in the second methylene bis-amide formation, removing the crystals of methylene bis-amide when formed.

7. The process in accordance with claim 6 wherein the second and subsequent additions of hexamethylene tetramine and starting amide are equal to approximately the equivalent yield obtained in the first reaction.

8. The process in accordance with claim 6 wherein R is alkyl.

9. The process in accordance with claim 6 wherein R is aryl.

10. The process in accordance with claim 6 wherein R is amide-substituted alkyl.

11. A process for producing methylene bis-amides which consists of the steps of dissolving an amide and hexamethylene tetramine in a non-aqueous solvent for both the amide and hexamethylene tetramine, reacting under anhydrous conditions in proportions so that the quantity of starting amide is substantially equal to the stoichiometric ratio required to give two amide groups to one —$CH_2$— group, at a temperature above that at which ammonia is given off and below that at which decomposition of any of the reactants takes place, said amide having the formula $NH_2COR$ wherein R is alkyl, removing the ammonia as formed, cooling the mixture and recovering crystalline methylene bis-amide.

12. A process for producing methylene bis-amides which consists of the steps of dissolving an amide and hexamethylene tetramine in a non-aqueous solvent for both the amide and hexamethylene tetramine, reacting under anhydrous conditions in proportions so that the quantity of starting amide is substantially equal to the stoichiometric ratio required to give two amide groups to one —$CH_2$— group, at a temperature above that at which ammonia is given off and below that at which decomposition of any of the reactants takes place, said amide having the formula $NH_2COR$ wherein R is amide-substituted alkyl, removing the ammonia as formed, cooling the mixture and recovering crystalline methylene bis-amide.

13. A process for producing methylene bis-amides which consists of the steps of dissolving an amide and hexamethylene tetramine in a non-aqueous solvent for both the amide and hexamethylene tetramine, reacting under anhydrous conditions in proportions so that the quantity of starting amide is substantially equal to the stoichiometric ratio required to give two amide groups to one —$CH_2$— group, at a temperature above that at which ammonia is given off and below that at which decomposition of any of the reactants takes place, said amide having the formula $NH_2COR$ wherein R is aryl, removing the ammonia as formed, cooling the mixture and recovering crystalline methylene bis-amide.

References Cited in the file of this patent

UNITED STATES PATENTS

| | | |
|---|---|---|
| 2,096,181 | Jahrstorfer et al. | Oct. 19, 1937 |
| 2,290,675 | D'Alelio | July 21, 1942 |
| 2,338,177 | Graenacher | Jan. 4, 1944 |
| 2,351,602 | D'Alelio | June 20, 1944 |
| 2,445,319 | Engelbrecht | July 20, 1948 |
| 2,475,846 | Lundberg | July 12, 1949 |

FOREIGN PATENTS

| | | |
|---|---|---|
| 506,393 | Great Britain | May 25, 1939 |
| 837,576 | France | Nov. 12, 1938 |

OTHER REFERENCES

Descude: "Annales de Chimie," Series 7, vol. 29 (1903), p. 542.

Einhorn: "Liebigs Annalen," vol. 361 (1908), pp. 150 and 151.